United States Patent
Ionescu

(10) Patent No.: US 9,705,938 B2
(45) Date of Patent: *Jul. 11, 2017

(54) SYSTEM AND METHOD FOR SUBSCRIBING FOR INTERNET PROTOCOL MULTIMEDIA SUBSYSTEMS (IMS) SERVICES REGISTRATION STATUS

(71) Applicant: T-Mobile USA, Inc., Bellevue, WA (US)

(72) Inventor: Alexandru Catalin Ionescu, Seattle, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/396,158

(22) Filed: Dec. 30, 2016

(65) Prior Publication Data

US 2017/0111406 A1 Apr. 20, 2017

Related U.S. Application Data

(63) Continuation of application No. 15/063,434, filed on Mar. 7, 2016, now Pat. No. 9,538,492, which is a (Continued)

(51) Int. Cl.
*H04W 24/00* (2009.01)
*H04L 29/06* (2006.01)
*H04W 68/00* (2009.01)

(52) U.S. Cl.
CPC ...... *H04L 65/1073* (2013.01); *H04L 65/1016* (2013.01); *H04W 68/00* (2013.01)

(58) Field of Classification Search
CPC ........... H04L 65/1073; H04L 65/1016; H04W 60/06; H04W 4/24; H04W 8/06; H04W 8/245; H04W 68/00; G06F 11/0772
(Continued)

(56) References Cited

U.S. PATENT DOCUMENTS 6,625,141 B1 9/2003 Glitho et al.
7,177,642 B2 * 2/2007 Sanchez Herrero ............ H04L 29/12188
455/433

(Continued)

FOREIGN PATENT DOCUMENTS

CN 1836422 A 9/2006
CN 101175083 A 5/2008
(Continued)

OTHER PUBLICATIONS

State Intellectual Property Office of the People's Republic of China, First Office Action, Chinese Patent Application 201280019691.9, mailed Sep. 5, 2016, 25 pages; includes English translation.
(Continued)

*Primary Examiner* — Mahendra Patel
(74) *Attorney, Agent, or Firm* — Perkins Coie LLP

(57) ABSTRACT

A system and method that allows mobile device applications to receive changes in registration status from application services that are accessed via an Internet Protocol Multimedia Subsystem (IMS). Applications on a mobile device subscribe to receive notifications of changes in registration status for requested services. When a change to the registration status of a service occurs, a notification message is transmitted to the application on the mobile device. Notifications of changes in status are thereby received by each application on a per-application-service basis. In some embodiments, when a request to register with an application service fails, the corresponding notification message includes a reason for the failure. In some embodiments, notification messages are originated by a registration manager that operates in the IMS and transmitted to an IMS client operating on a mobile device. In some embodiments,
(Continued)

notification messages are originated by each application service and transmitted directly to subscribed applications.

20 Claims, 12 Drawing Sheets

Related U.S. Application Data continuation of application No. 14/685,541, filed on Apr. 13, 2015, now Pat. No. 9,280,408, which is a continuation of application No. 14/109,849, filed on Dec. 17, 2013, now Pat. No. 9,008,650, which is a continuation of application No. 13/403,931, filed on Feb. 23, 2012, now Pat. No. 8,611,890.

(60) Provisional application No. 61/445,958, filed on Feb. 23, 2011.

(58) Field of Classification Search
 USPC ...................................................... 455/456.3
 See application file for complete search history.

(56) References Cited

U.S. PATENT DOCUMENTS

| | | | |
|---|---|---|---|
| 7,353,017 B2 | 4/2008 | Chen et al. | |
| 8,055,774 B2 * | 11/2011 | Kaura | H04L 65/1016 370/254 |
| 8,392,582 B2 * | 3/2013 | Noldus | H04L 29/12094 709/227 |
| 8,611,890 B2 | 12/2013 | Ionescu | |
| 9,008,650 B2 | 4/2015 | Ionescu | |
| 9,280,408 B2 | 3/2016 | Ionescu | |
| 9,538,492 B2 | 1/2017 | Ionescu | |
| 2004/0047339 A1 * | 3/2004 | Wang | H04L 41/12 370/352 |
| 2004/0205212 A1 * | 10/2004 | Huotari | H04W 8/18 709/230 |
| 2005/0041648 A1 * | 2/2005 | Bharatia | H04L 63/10 370/352 |
| 2010/0228815 A1 * | 9/2010 | Stokking | H04M 7/0024 709/203 |
| 2011/0026510 A1 * | 2/2011 | Matsumura | H04L 12/2834 370/338 |
| 2011/0051701 A1 * | 3/2011 | Cai | H04L 65/1016 370/338 |
| 2012/0214480 A1 | 8/2012 | Ionescu | |

FOREIGN PATENT DOCUMENTS

| | | |
|---|---|---|
| CN | 101267429 A | 9/2008 |
| WO | 2012116235 | 8/2012 |

OTHER PUBLICATIONS

International Searching Authority, International Search Report, PCT Application PCT/US2012/026404, mailed Aug. 24, 2012, 2 pages.

* cited by examiner

BACKGROUND

BACKGROUND

```
800

<?xml version="1.0"?>
<reginfo xmlns="urn:ietf:params:xml:ns:reginfo"           ⎤
        xmlns:xsi=http://www.w3.org/2001/XMLSchema-instance   ⎬ 805
        version="0" state="full">                         ⎦
    <registration aor="sip:user@example.com" id="as9"     ⎤ 810
                state="active">                           ⎦
        <contact id="76" state="active" event="registered"
                duration-registered="7322">
            <uri>sip:user@pc887.example.com</uri>
    815 ⎯  <unknown-param name="icsi-ref">
            urn:urn-7:3gpp-service.ims.icsi.mmtel
            </unknown-param>
        </contact>
        <contact id="76" state="terminated" event="rejected"
                duration-registered="7322">
            <uri>sip:user@pc887.example.com</uri>
    815 ⎯  <unknown-param name="iari-ref">
            urn%3Aurn-7%3A3gpp-application.ims.iari.gamex-v1
            </unknown-param>
            <reason>                                              ⎤
            Your Subscription to GameX services has been terminated ⎬ 820
            </reason>                                             ⎦
        </contact>
    </registration>
</reginfo>
```

*FIG. 8*

SYSTEM AND METHOD FOR SUBSCRIBING FOR INTERNET PROTOCOL MULTIMEDIA SUBSYSTEMS (IMS) SERVICES REGISTRATION STATUS

CROSS-REFERENCE TO RELATED APPLICATION

This application is a continuation of U.S. patent application Ser. No. 15/063,434, entitled SYSTEM AND METHOD FOR SUBSCRIBING FOR INTERNET PROTOCOL MULTIMEDIA SUBSYSTEMS (IMS) APPLICATION SERVICES REGISTRATION STATUS, filed Mar. 7, 2016, now U.S. Pat. No. 9,538,492, which is a continuation of U.S. patent application Ser. No. 14/685,541, entitled SYSTEM AND METHOD FOR SUBSCRIBING FOR INTERNET PROTOCOL MULTIMEDIA SUBSYSTEMS (IMS) APPLICATION SERVICES REGISTRATION STATUS, filed Apr. 13, 2015, now U.S. Pat. No. 9,280,408, which is a continuation of U.S. patent application Ser. No. 14/109,849, entitled SYSTEM AND METHOD FOR SUBSCRIBING FOR INTERNET PROTOCOL MULTIMEDIA SUBSYSTEMS (IMS) APPLICATION SERVICES REGISTRATION STATUS, filed Dec. 17, 2013, now U.S. Pat. No. 9,008,650; which is a continuation of U.S. patent application Ser. No. 13/403,931, entitled SYSTEM AND METHOD FOR SUBSCRIBING FOR INTERNET PROTOCOL MULTIMEDIA SUBSYSTEMS (IMS) APPLICATION SERVICES REGISTRATION STATUS, filed Feb. 23, 2012, now U.S. Pat. No. 8,611,890; which claims the benefit of U.S. Provisional Application No. 61/445,958, entitled SUBSCRIBING FOR INTERNET PROTOCOL MEDIA SUBSYSTEMS (IMS) SERVICES REGISTRATION STATUS, filed Feb. 23, 2011, the entireties of both which are hereby incorporated by reference.

BACKGROUND

The Internet Protocol Multimedia Subsystem ("IMS") is an architectural framework for delivering Internet Protocol ("IP") multimedia to mobile users, such as users of mobile devices like smart phones or tablet computers. An IMS core network ("IMS core") permits wireless and wireline devices to access multimedia, messaging, and voice applications and services. IMS standards and specifications have been promulgated by the 3rd Generation Partnership Project ("3GPP" ™). To allow the IMS core to be integrated with Internet resources, the 3GPP specifications use Internet Engineering Task Force protocols within the IMS core, such as Session Initiation Protocol ("SIP") and Diameter. SIP is a signaling protocol used for creating, modifying and terminating two-party or multiparty sessions consisting of one or several media streams. A mobile device registers its IP address with a SIP registrar server within an IMS core by generating and sending a SIP request message with a "REGISTER" method token. Once registered, a mobile device may subsequently establish multimedia sessions via the IMS core.

An IMS client (or IMS stack) software component on a mobile device allows one or more applications on the mobile device to register for various application services that are available on the IMS network. If the registration is successful, the mobile device application may then take advantage of the functionality offered by the application service to which it is registered. If the registration is unsuccessful, however, then the application will be unable to take advantage of the offered functionality. In cases where a requested registration fails, the requesting application may benefit from receiving a notification of the failure. In current systems, the requesting application may receive a generic notification that alerts the mobile device only that one or more registration failures have occurred—without providing an indication as to which specific service registration failed. This shortcoming leads to situations where one rejected application service triggers deregistration of all applications—even those applications that are not necessarily supposed to terminate. Moreover, in current systems, the generic notification may omit information describing the nature of or reason for the failure. The lack of information conveyed to the application on the mobile device means that it is unable to effectively assess what additional steps, if any, it should take in order register with the application service.

FIGS. 1A and 1B offer high level illustrations of the IMS application service registration procedure according to current systems. In FIG. 1A, Application 1 sends to the IMS client a request to register for an application service identified as ICSI_1 (step 1); Application 2 sends to the IMS client a request to register for an application service identified as ICSI_2 (step 2); and Application 3 sends to the IMS client a request to register for an application service identified as ICSI_3 (step 3). After receiving the service registration requests, the IMS client transmits all of the received registration requests to the IMS network (step 4), which returns an acknowledgement message to the IMS client (step 5). In step 6, the IMS network sends a registration request for the application service identified as ICSI_3 to Application Server 3 (which is associated with ICSI_3); in step 7, the IMS network sends a registration request for the application service identified as ICSI_2 to Application Server 2 (which is associated with ICSI_2); and, in step 8, the IMS network sends a registration request for the application service identified as ICSI_1 to Application Server 1 (which is associated with ICSI_1). After the IMS network sends each registration request to its associated application server, each respective application server returns to the IMS network an acknowledgment that indicates whether the registration succeeded or failed. For example, in step 9, Application Server 3 returns an "OK" acknowledgment to inform the IMS network that the registration succeeded; in step 10, Application Server 2 returns an "OK" acknowledgment to inform the IMS network that the registration succeeded; and, in step 11, Application Server 1 returns an "OK" acknowledgement to inform the IMS network that the registration succeeded.

Accordingly, FIG. 1A illustrates a successful registration flow in which each requested registration succeeded for each requested service. In practice, however, one or more requested registrations may fail. For example, FIG. 1B illustrates a registration flow identical to FIG. 1A with the exception that, in step 9, Application Server 3 returns a "NOK" acknowledgement. Unlike the "OK" acknowledgement in step 9 of FIG. 1A, the "NOK" acknowledgement in step 9 of FIG. 1B indicates that the registration for the application service identified as ICSI_3 has failed.

When such a failure occurs, the application that requested the registration may benefit from receiving a notification that the failure occurred. Accordingly, an application may subscribe to receive notifications indicating whether a requested registration is successful or unsuccessful. In practice, a single application may request registrations for multiple services. For example, a single application may request a registration to Service A, which ultimately succeeds; may request a registration to Service B, which ultimately succeeds; and may request a registration to Service C, which ultimately fails. In current systems, the application would be notified only that a failure was received; the application would not be notified as to which particular application service failed. In other words, the application would know that at least one application service failed, but the application would not know whether the failure occurred with respect to Service A, Service B, or Service C. As a result, the application would be forced to terminate all application services (i.e., the application would terminate Service A, Service B, and Service C) rather than terminating only the one service that failed (i.e., Service C). Moreover, in current systems, the application receives no reason for the failure. For example, the application does not know whether the requested registration failed because the mobile device user has not paid for access to the failed service, because a physical connection could not be established to the server associated with the requested service, or for a host of possible other reasons.

BRIEF DESCRIPTION OF THE DRAWINGS

FIG. 8 is an example of an XML document that provides details of a registration status to an application.

DETAILED DESCRIPTION

Figure 1A:
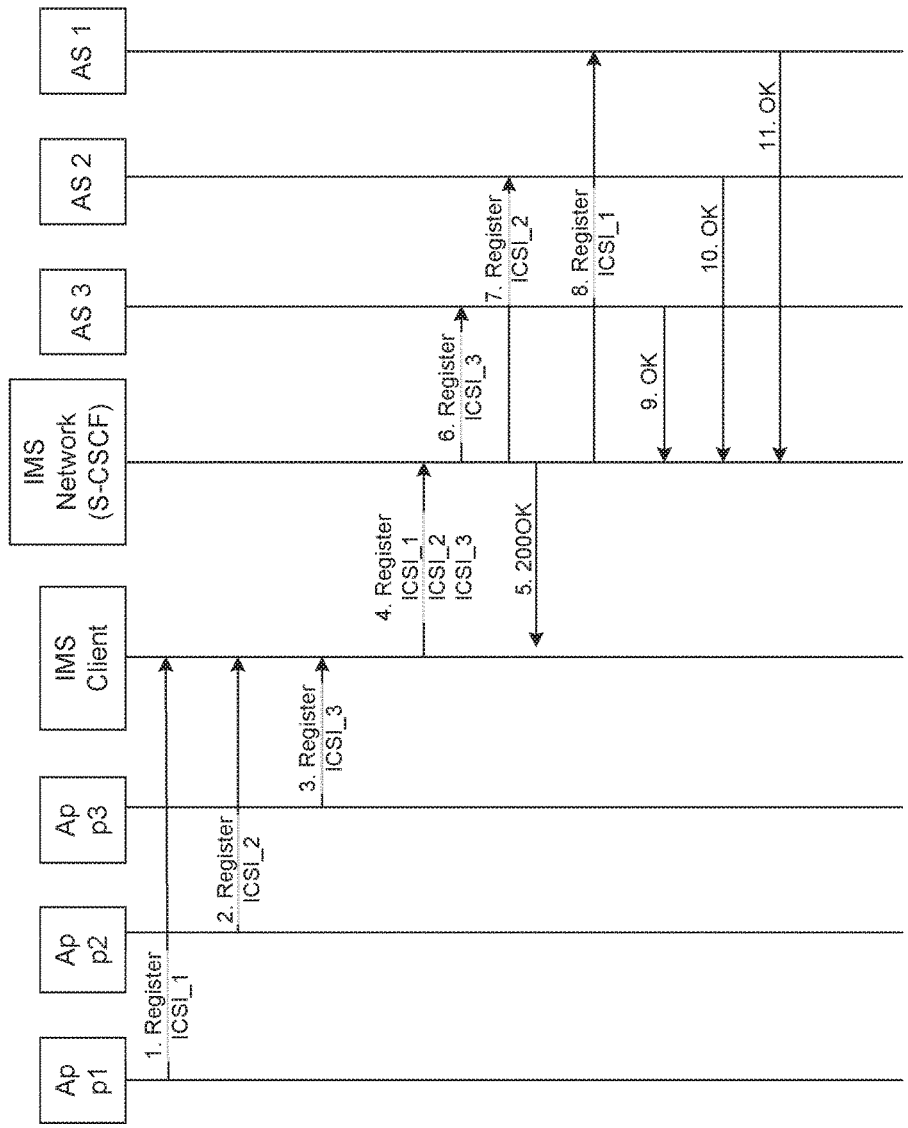
FIG. 1A is a flow diagram illustrating a successful registration for IMS services.
Figure 1B:
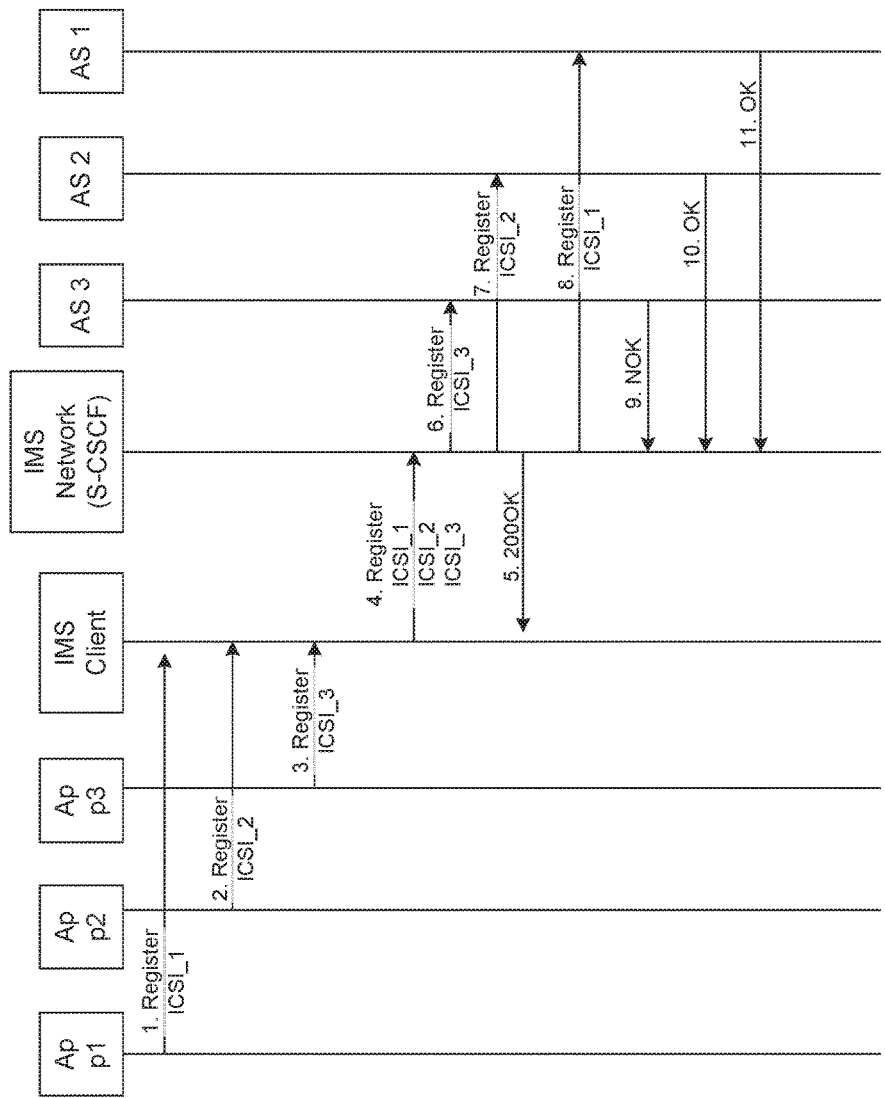
FIG. 1B is a flow diagram illustrating an unsuccessful registration for IMS services.

A system and method that allows mobile device applications to receive changes in registration status from application services that are accessed via an Internet Protocol Multimedia Subsystem (IMS) is disclosed herein. Applications on a mobile device transmit a request to register with one or more application services available via the IMS network. The applications on the mobile device subscribe to receive notifications of changes in registration status for the one or more requested services. When a change to the registration status of a service occurs—particularly a termination of a service—a notification message is transmitted to the application on the mobile device. By receiving notifications of changes in status on a per-application-service basis, applications in the mobile device are better able to assess what remedial steps, if any, may be taken to re-subscribe to the application service, locate a different application service, or halt or otherwise adjust the operation of the current application in the event of a registration failure.

In some embodiments, when a request to register with an application service fails, the corresponding notification message includes a reason for the failure. The reason for the failure may be transmitted to the mobile device in, for example, an extensible markup language (XML) document. The reason for the failure provides additional information to assist applications on the mobile device to determine what, if any, remedial steps should be taken. In some embodiments, the notification message extends the Subscription to Registration Information defined by the Internet Engineering Task Force (IETF) in a Request for Comments (RFC). In one example, IMS Communication Service Identifiers (ICS's) and IMS Application Registry Identifiers (IARIs) are used to communicate the status of individual services.

In some embodiments, notification messages are originated by a registration manager that operates in the IMS. The registration manager transmits notification messages to an IMS client operating on a mobile device, where the contents of the messages are distributed to the subscribed applications on the mobile device. In some embodiments, notification messages are originated by each application service and transmitted directly to subscribed applications on a mobile device.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Representative Environment

Figure 2A:
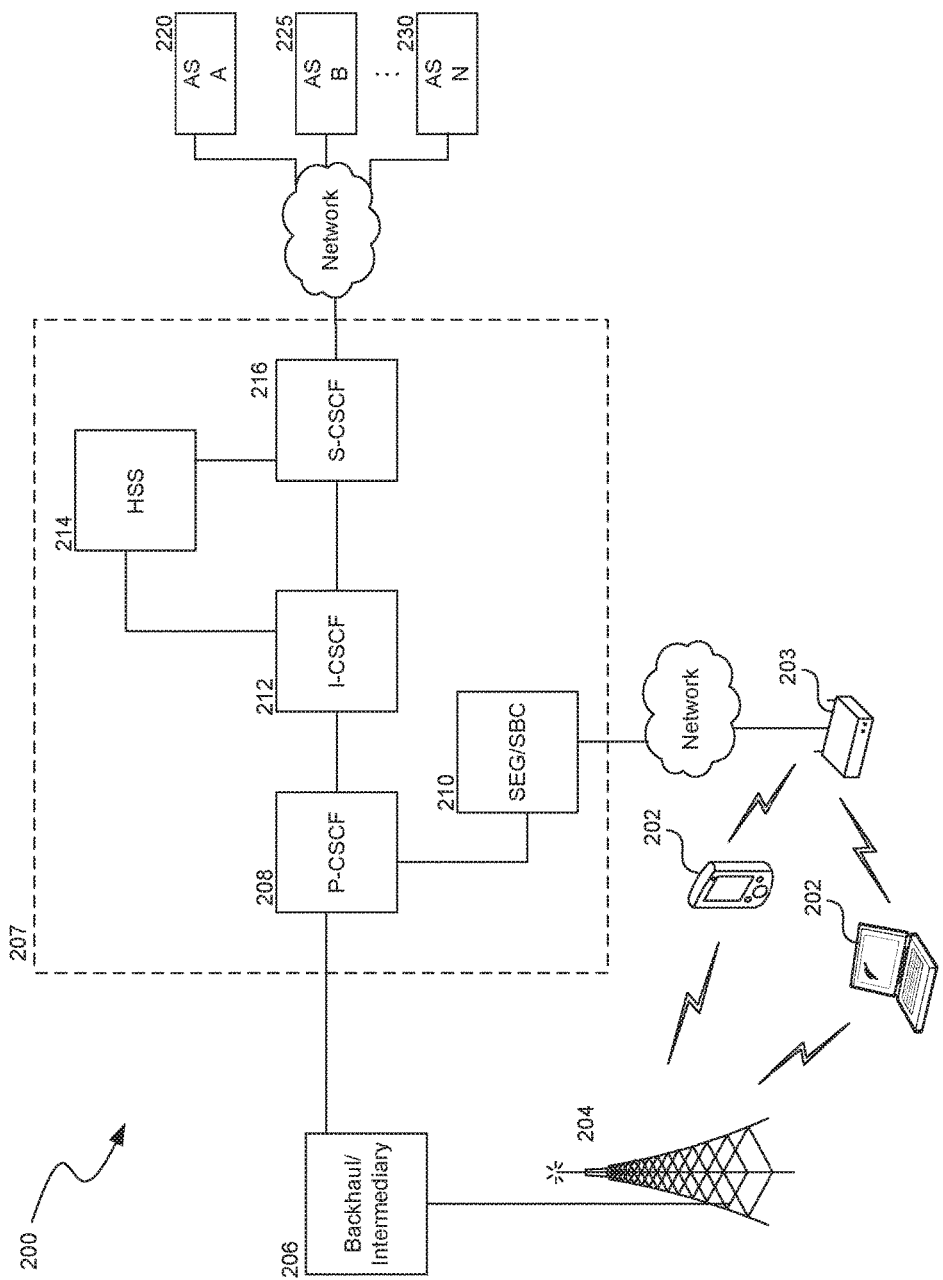
FIG. 2A is a diagram of a representative Internet Protocol Multimedia Subsystem (IMS) environment in which application services may be subscribed to by mobile devices.

FIG. 2A is a diagram of a representative Internet Protocol Multimedia Subsystem (IMS) environment 200 in which notification messages from application services reflecting changes in registration status are communicated to mobile devices. In the environment 200, mobile devices 202 are configured to communicate with, or through, a trusted radio access network ("RAN") 204 and/or an untrusted RAN 203, in order to register with and utilize an IMS core 207. The IMS allows service providers to implement a compelling set of mobile services for mobile devices. IMS registration for different IMS services may be based on SIP Event Package for Registration Information defined in Request for Comments (RFC) 3680 and procedures defined in 3GPP Test Specification (TS) 24.229.

Users may employ mobile devices 202 to communicate with other users and devices. In addition, users may employ mobile devices 202 to receive, provide, or otherwise interact with multiple IMS services. For example, location-based services are services that use the actual or approximate location of a mobile device to provide, enhance, or supplement a service to the mobile device. Location-based services include, but are not limited to, services such as emergency services (e.g., E911), asset tracking or recovery services (e.g., the tracking of a stolen car), location-based alerts or advertising services (e.g., targeted advertisements that depend on the location of a mobile device user), social networking services (e.g., services that report the relative location of friends or family), and/or the like. In addition, users may employ mobile devices 202 to receive, provide, or otherwise interact with additional IMS services, including image sharing services, gaming services, multimedia telephony services, instant messaging and presence services, video conferencing and sharing services, Push-to-talk over Cellular (PoC) services, 3GPP combinational services (CSI), and other telecommunications and Internet converged services. Once a mobile device 202 has successfully registered with the IMS core 207, the device may establish multimedia sessions managed by the IMS core in order to access applications and services that facilitate communication, location-based services and/or other services.

Mobile devices 202 may include virtually any devices for communicating over a wireless network. Such devices include mobile telephones, such as Global System for Mobile Communications ("GSM") telephones, Time Division Multiple Access ("TDMA") telephones, Universal Mobile Telecommunications System ("UMTS") telephones, Evolution-Data Optimized ("EVDO") telephones, Long Term Evolution ("LTE") telephones, Generic Access Network ("GAN") telephones, Unlicensed Mobile Access ("UMA") telephones, and other mobile computers or devices, such as Voice over Internet Protocol ("VoIP") devices, Secure User Plane Location ("SUPL") Enabled Terminals (SETs), Personal Digital Assistants ("PDAs"), radio frequency devices, infrared devices, handheld computers, laptop computers, wearable computers, tablet computers, pagers, integrated devices combining one or more of the preceding devices, and/or the like.

Figure 2B:
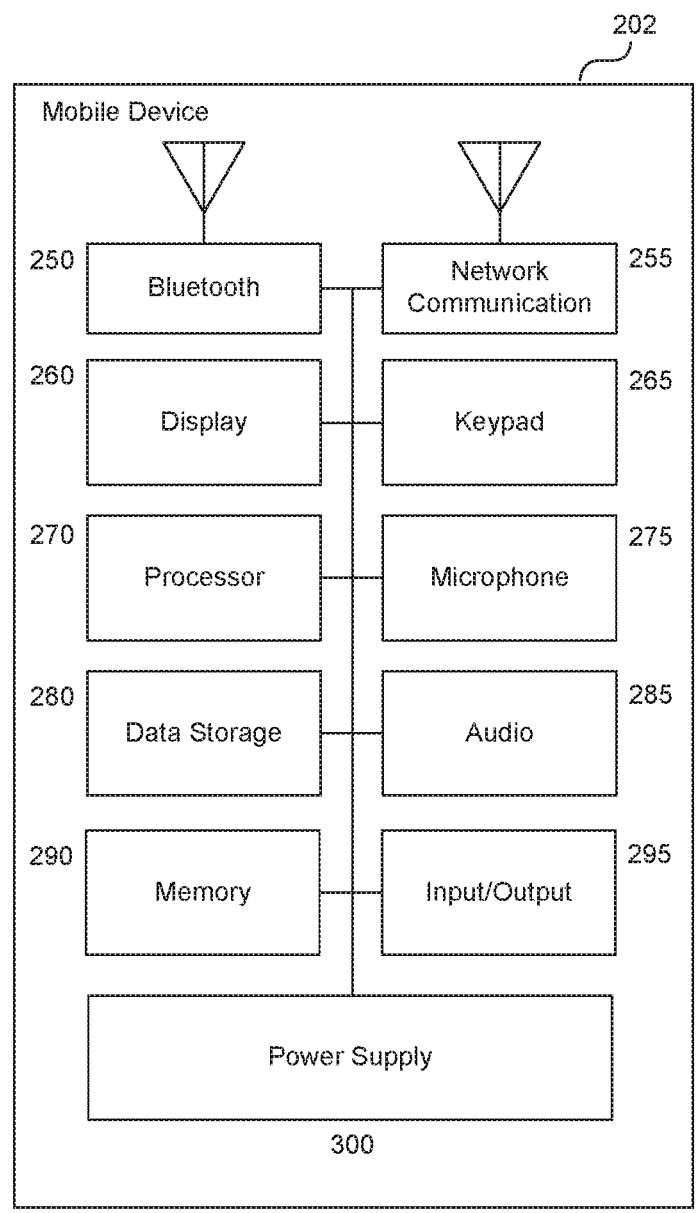
FIG. 2B is a block diagram of components in a mobile device that enable receipt of notifications of changes in registration status on a per-application basis.

As shown in FIG. 2B, which is a block diagram of a representative mobile device, each mobile device 202 typically includes a processor 270 for executing processing instructions, a data storage medium component 280 (e.g., hard drive, flash memory, memory card, etc.), volatile memory and/or nonvolatile memory 290, a power supply 300, one or more network interfaces (e.g., Bluetooth Interface 250; and Network Communication Interface 255, which enables the mobile phone to communicate by transmitting and receiving wireless signals using licensed, semi-licensed or unlicensed spectrum over a telecommunications network), an audio interface 285, a display 260, a keypad or keyboard 265, and other input and/or output interfaces 295. The various components of a mobile device may be interconnected via a bus. The volatile and nonvolatile memories generally include storage media for storing information such as processor-readable instructions, data structures, program modules, or other data. Some examples of information that may be stored include basic input/output systems (BIOS), operating systems, and applications. The stored information may include one or more SIP clients capable of generating, transmitting and interpreting syntactically correct SIP messages. SIP clients permit the mobile device to register with and communicate via the ISM core 207.

Returning to FIG. 2A, mobile devices 202 may connect to the IMS core 207 by a trusted RAN 204 or an untrusted RAN 203. Both types of RANs provide a first physical wireless link between mobile devices 202 and the IMS core. A single mobile device may be capable of using one or both types of RANs. The RANs 203, 204 may use any wireless communications and data protocol or standard, such as GSM, TDMA, UMTS, EVDO, LTE, GAN, UMA, Code Division Multiple Access ("CDMA") protocols (including IS-95, IS-2000, and IS-856 protocols), Advanced LTE or LTE+, Orthogonal Frequency Division Multiple Access ("OFDM"), General Packet Radio Service ("GPRS"), Enhanced Data GSM Environment ("EDGE"), Advanced Mobile Phone System ("AMPS"), WiMAX protocols (including IEEE 802.16e-2005 and IEEE 802.16m protocols), Wireless Fidelity ("WiFi"), High Speed Packet Access ("HSPA"), (including High Speed Downlink Packet Access ("HSDPA") and High Speed Uplink Packet Access ("HSUPA")), Ultra Mobile Broadband ("UMB"), SUPL, and/or the like.

The trusted RAN 204 is a RAN operated by the operator of the IMS core 207 or another trusted party that is associated with the IMS core operator (e.g., the operator's contractor, affiliate, or industry partner). In order to wirelessly communicate via the trusted RAN, a mobile device 202 may need to pass preliminary authentication/authorization checks implemented in part by the trusted RAN. The trusted RAN is connected to and communicates with the IMS core via a dedicated backhaul (e.g., a private network that is not open to the public) and intermediary components 206. The intermediary components may include, for example, a Gateway GPRS Support Node ("GGSN"), Serving GPRS Support Node ("SGSN") or similar components that facilitate mobility management, session management, and transport for IP packet services within the trusted RAN 204.

The untrusted RAN 203 is a RAN that connects to the IMS core 207 over a public network such as the Internet. The untrusted RAN may not implement authentication/authorization tests sufficient to prevent security attacks upon the IMS core. In some examples, a mobile device 202 uses a WiFi, GAN, or UMA protocol to connect to an untrusted RAN at a wireless access point.

The intermediary components 206 and the untrusted RAN 103 are both connected to the IMS core 207. The IMS core comprises various Call Session Control Functions ("CSCF") and other components that, inter alia, provide SIP registrar and proxy functionality. The IMS core comprises a proxy CSCF ("P-CSCF") 208, an interrogating CSCF ("I-CSCF") 212, a serving CSCF ("S-CSCF") 216, a Security Gateway ("SEG")/Session Border Controller ("SBC") 210, and a Home Subscriber Server ("HSS") 214. The basic functionalities of the IMS core components are described by standards promulgated by the 3GPP, including 3GPP TS 23.002, version 9.2.0 Release 9, which is hereby incorporated by reference in its entirety.

As shown in FIG. 2A, the intermediary components 206 connect the trusted RAN 204 to the IMS core 207 via the P-CSCF 208. In contrast, the untrusted network 203 connects to the P-CSCF 208 indirectly via the SEG/SBC 210. The SEG/SBC may establish a secure IP tunnel between a mobile device 202 and the IMS core. In some examples, a trusted network 204 may connect to the P-CSCF via the SEG/SBC. In other examples, the untrusted network may directly connect to the P-CSCF via the Internet.

In order to register with the IMS core 207, a SIP client running on a mobile device 202 generates and sends an initial SIP registration message to the IMS core via the trusted RAN 204 or untrusted RAN 203. The initial registration message comprises a REGISTER method token and extended header information, including an IMEI and IMSI associated with the mobile device 202. The P-CSCF 208 receives the initial SIP registration message and forwards the message to the I-CSCF 212. One skilled in the art will appreciate that in some examples, the P-CSCF may also perform some or all of the functionality of the SEG/SBC 210.

The I-CSCF 212 and/or S-CSCF 216 may utilize the IMEI/IMSI identifiers in the received registration message to generate and send a user authorization request ("UAR") to the HSS 214 via the Diameter protocol. The UAR includes, inter alia, the IMEI and IMSI associated with the mobile device 202. In some examples, the I-CSCF utilizes the SIP registration message forwarded from the P-CSCF to generate and send the UAR to the HSS and the S-CSCF implements additional standard IMS registration methods. In other examples, the I-CSCF does not generate and send the UAR, but instead queries the HSS to identify which S-CSCF to forward the registration message to. In such examples, the I-CSCF then forwards the received SIP registration message to the identified S-CSCF. As described in greater detail herein, the S-CSCF then utilizes the SIP registration message to generate and send the UAR to the HSS. The S-CSCF may send the SIP registration message to one or more application servers 220, 225, and 230 in order to complete the registration process. The S-CSCF also implements additional standard IMS registration methods (e.g., HTTP digest or Authentication and Key Agreement ("AKA") authentication).

The HSS 214 is a master user database that contains subscription-related information such as subscriber profiles. The HSS performs authentication and authorization of a mobile device 202 and provides information about a mobile device's IP address. The HSS may perform standard IMS registration processes as described by 3GPP specifications and standards. The HSS also validates the IMEI/IMSI identifiers in the UAR in order to determine whether to deny registration to a mobile device 202. The HSS may also use a received IMEI to determine the capabilities of a mobile device.

Overview of Registration with IMS Services

Figure 3A:
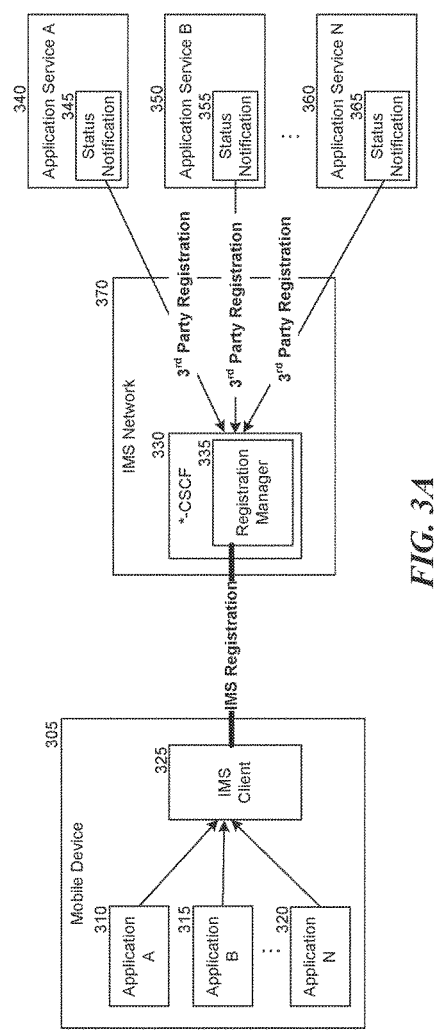
FIG. 3A is a block diagram illustrating a simplified view of the delivery of application services to mobile devices.

FIG. 3A is a block diagram providing a simplified view of the registration and delivery of IMS application services to mobile devices. Applications running in the mobile device 305 use an IMS client 325 to register for application services in the IMS network. The IMS client (or IMS stack) maintains an IMS registration as long as an application needs to stay connected with a corresponding application service. The IMS proxies (*-CSCFs) 330 in the IMS network maintain the registration initiated by the mobile device and provide the appropriate routing for IMS traffic. When for any reason one of the application servers involved rejects the initial registration request, the IMS service is not available to the mobile device and the application functionality on the mobile device may be substantially or completely impacted by the registration failure.

In FIG. 3A, three applications on the mobile device 305 are depicted as using applications services, namely application A (310), application B (315), and application N (320). Applications on the mobile device communicate with the IMS network through IMS client 325. The IMS client 325 resides within the mobile device and manages communications between mobile device applications and other components in the IMS network. For example, IMS client 325 receives registration requests from the mobile device applications (310, 315, and 320), forwards the received registration requests to IMS network 370, receives registration status notification subscription requests from the mobile device applications, and forwards the received registration status notification subscription requests to the IMS network. In some embodiments, the IMS client 325 additionally receives registration status notifications from the application services 340, 350, and 360 and forwards the received status notifications to the appropriate mobile device applications. Those skilled in the art will appreciate that the IMS client 325 may be implemented in an Android™, Windows™, iOS™, or other operating system environment that is used by mobile devices.

The IMS client 325 connects to a registration manager component 335 within one or more of the CSCF 330 in the IMS network. The registration manager component 335 resides within the IMS network and manages registrations between one or more mobile device applications 310, 315, and 320 and one or more application services 340, 350, and 360. For example, registration manager 335 receives registration requests from the mobile device applications, forwards the received registration requests to the appropriate application servers, receives registration status notification subscription requests from the IMS client, and forwards the received registration status notification subscription requests to the appropriate application servers. In some embodiments, registration manager 335 may receive a single request that functions as both a registration request and a registration status notification subscription request. After receiving the request, registration manager 335 may forward the request to the appropriate application service and automatically subscribe the application to receive status notifications associated with that service. In some embodiments, registration manager 335 additionally receives registration status notifications from one or more application servers and forwards the received registration status notifications to the IMS client 325.

Figure 3B:
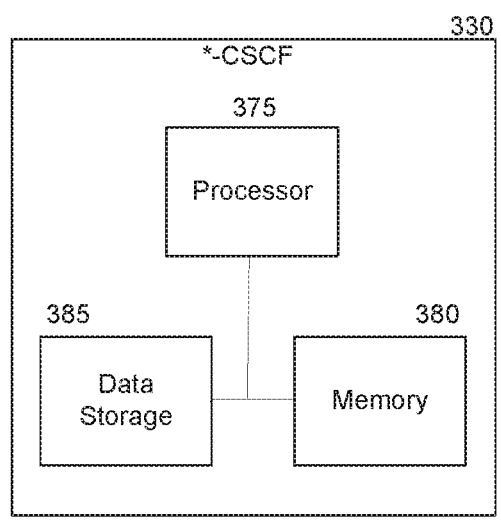
FIG. 3B is a block diagram of components of a Call Session Control Function (CSCF) network node that provides notifications of changes in registration status on a per-application basis.

FIG. 3B is a block diagram of a CSCF 330 node within IMS network 370 which implements the functionality of the registration manager component 335. The CSCF 330 may contain one or more processors 375 for executing processing instructions, a data storage medium component 385 (e.g., hard drive, flash memory, memory card, etc.), and volatile memory and/or nonvolatile memory 380. Instructions for implementing functions of the registration manager 335 may be stored in the data storage medium and/or memory and executed by the processor. While the registration manager component 335 functionality is depicted as residing within the CSCF 330 in FIG. 3B, it will be appreciated that the registration manager component 335 may be implemented independently from the CSCF 330. That is, the registration manager component 335 may be operated as a stand-alone service within the IMS network 370 or may be incorporated in other network nodes within the IMS network 370.

Returning to FIG. 3A, IMS network 370 may be connected to multiple application servers which provide application services. For example, registration manager 335 may connect to a status notification component 345 within application service A, to status notification component 355 within application service B, and to status notification component 365 within application service N. Each status notification component (345, 355, 365) resides within its respective application service, manages communications between its respective application servers and the IMS network, and processes the registration request (i.e., enables an active connection between the application that initiated the registration request and the application server on which the requested service resides). For example, the status notification component 355 receives a registration request from the IMS network, processes the requested registration, and generates a registration status notification that indicates whether the requested registration was successful or unsuccessful. In one embodiment, the status notification component 355 sends the generated notification to the IMS network, which may then forward the generated notification to the requesting application. In another embodiment, the status notification component 355 sends the generated notification directly to the application that requested the registration to the service. In FIG. 3A, the three services are independent of each other, i.e., the value provided by application service A does not depend on application service B or application service C being available. Moreover, service A will remain available even if access to service B is not granted or otherwise terminates for any reason.

Registration to IMS Services and Subscription to Registration Information

Figure 4:
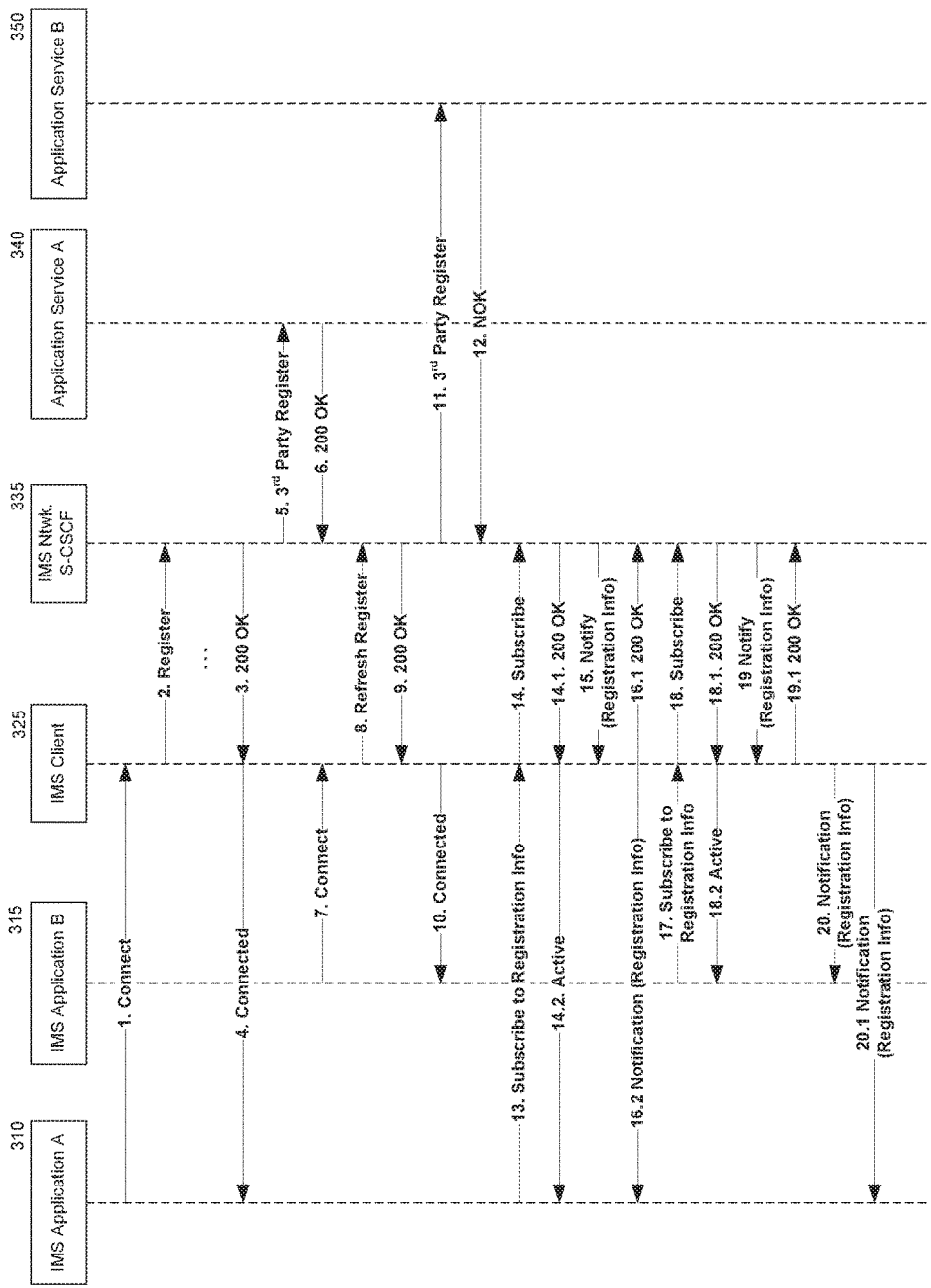
FIG. 4 is a flow diagram illustrating a partially unsuccessful registration for IMS services.

FIG. 4 is a flow diagram illustrating a partially unsuccessful registration for IMS services. Application A connects to the IMS client (step 1), which requests a registration to the IMS network (step 2). The IMS network authenticates the mobile device on which the requesting application resides and sends to the IMS client an indication of whether the IMS network registration was successful or unsuccessful. For example, in step 3, the IMS network returns a "200 OK" status to the IMS client, thereby indicating that the registration to the IMS network succeeded. In step 4, the IMS client forwards the successful status indication to Application A. In step 5, after receiving the registration request, the IMS network forwards the registration request (originating from Application A) to Application Service A. Application Service A may return to the IMS network an indication of whether the application service registration was successful or unsuccessful. For example, at step 6, Application Service A returns a "200 OK" status to the IMS network, thereby indicating that the registration to Application Service A succeeded.

Next, Application B connects to the IMS client (step 7) to request a registration to the IMS network (step 8). Because the mobile device on which Application B resides was previously connected to the IMS network (in step 2), the connection is simply refreshed rather than reestablished (step 8). The IMS network then sends to the IMS client an indication of whether the IMS network refresh was successful or unsuccessful. For example, in step 9, the IMS network returns a "200 OK" status to the IMS client, thereby indicating that the registration (i.e., the refresh) to the IMS network succeeded. In step 10, the IMS client forwards the successful status indication to Application B. In step 11, after receiving the registration request, the IMS network forwards the registration request (originating from Application B) to Application Service B. Application Service B may return to the IMS network an indication of whether the application service registration was successful or unsuccessful. For example, at step 12, Application Service B returns a "200 NOK" status to the IMS network, thereby indicating that the registration to Application Service B failed.

In order to be made aware of any failed registration requests, Application A may request a subscription to receive notifications regarding any requested connections. For example, in step 13, Application A sends a subscription request to the IMS client. In step 14, the IMS client forwards the subscription request to the IMS network. The IMS network then sends to the IMS client an indication of whether the subscription to receive notifications was successful or unsuccessful. For example, the IMS network returns a "200 OK" confirmation to the IMS client (step 14.1), which then forwards the confirmation to Application A (step 14.2).

In step 15, the IMS network sends notification information to the IMS client. The IMS client acknowledges receipt of the notification (step 16.1) and forwards the received notification to Application A (step 16.2) because Application A previously subscribed to receive notifications (step 13).

In step 17, Application B sends a subscription request to the IMS client. In step 18, the IMS client forwards the subscription request to the IMS network. The IMS network then sends to the IMS client an indication of whether the subscription to receive notifications was successful or unsuccessful. For example, the IMS network returns a "200 OK" confirmation to the IMS client (step 18.1), which then forwards the confirmation to Application B (step 18.2).

In step 19, the IMS network sends notification information to the IMS client. The IMS client acknowledges receipt of the notification (step 19.1) and forwards the received notification to Application B (step 20) because Application B previously subscribed to receive notifications (step 17). In addition, the IMS client forwards the received notification to Application A (step 20.1) because Application A also previously subscribed to receive notifications (step 13). The notification information provides an indication of the status of the services to each application on a per-service basis. Providing notification information to the applications allows the applications to better determine what actions to take when the status of an application service changes.

Figure 5:
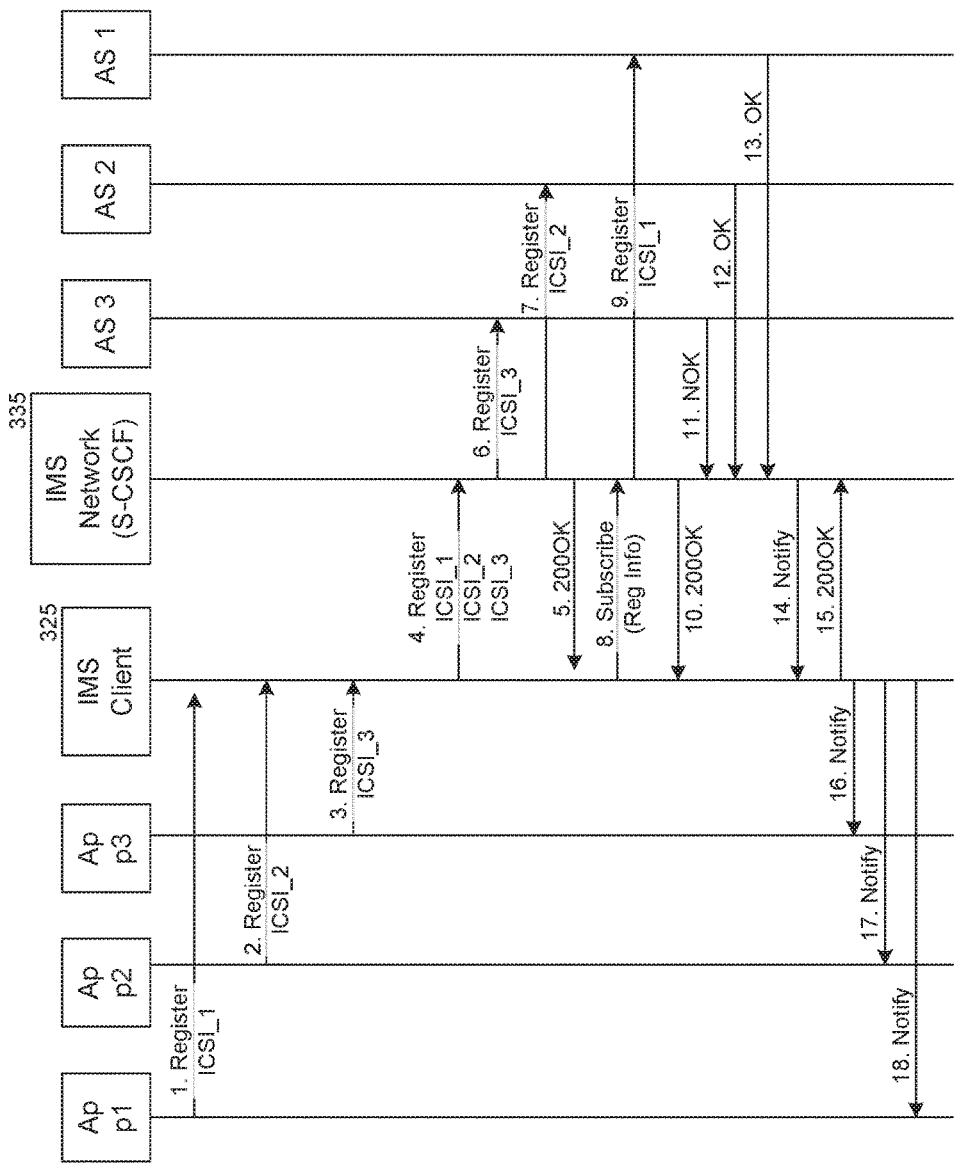
FIG. 5 is a flow diagram illustrating a successful registration for IMS services in which each requesting application receives a registration status notification from an IMS client.

FIG. 5 is a flow diagram illustrating a successful registration for IMS services in which each requesting application receives a registration status notification from the IMS client 325. Application 1 sends to the IMS client a request to register for a service identified as ICSI_1 (step 1); Application 2 sends to the IMS client a request to register for a service identified as ICSI_2 (step 2); and Application 3 sends to the IMS client a request to register for a service identified as ICSI_3 (step 3). After receiving the service registration requests, the IMS client sends all of the received requests to the IMS network (step 4), which returns an acknowledgement message to the IMS client (step 5). In step 6, the IMS network sends a registration request for the service identified as ICSI_3 to Application Service 3 (which is associated with ICSI_3); in step 7, the IMS network sends a registration request for the service identified as ICSI_2 to Application Service 2 (which is associated with ICSI_2); and, in step 9, the IMS network sends a registration request for the service identified as ICSI_1 to Application Service 1 (which is associated with ICSI_1). At step 8, the IMS network receives from the IMS client a subscription request to receive notification information regarding all registration requests sent by the IMS client. At step 10, the IMS network sends to the IMS client an acknowledgement of the request. After the IMS client is successfully subscribed to receive notifications, the IMS network receives registration status from each service for which a registration has been requested: in step 11, Application Service 3 sends a "NOK" acknowledgment to inform the IMS network that the registration failed; in step 12, Application Service 2 returns an "OK" acknowledgment to inform the IMS network that the registration succeeded; and, in step 13, Application Service 1 returns an "OK" acknowledgement to inform the IMS network that the registration succeeded. After receiving registration status for each service, the IMS network sends a notification to the IMS client (step 14), which returns an acknowledgment to the IMS network (step 15). After receiving the notification from the IMS network, the IMS client forwards the received notification to all applications connected to the IMS client: at step 16, the IMS client forwards the received notification to Application 3; at step 17, the IMS client forwards the received notification to Application 2; and, at step 18, the IMS client forwards the received notification to Application 1.

Figure 6:
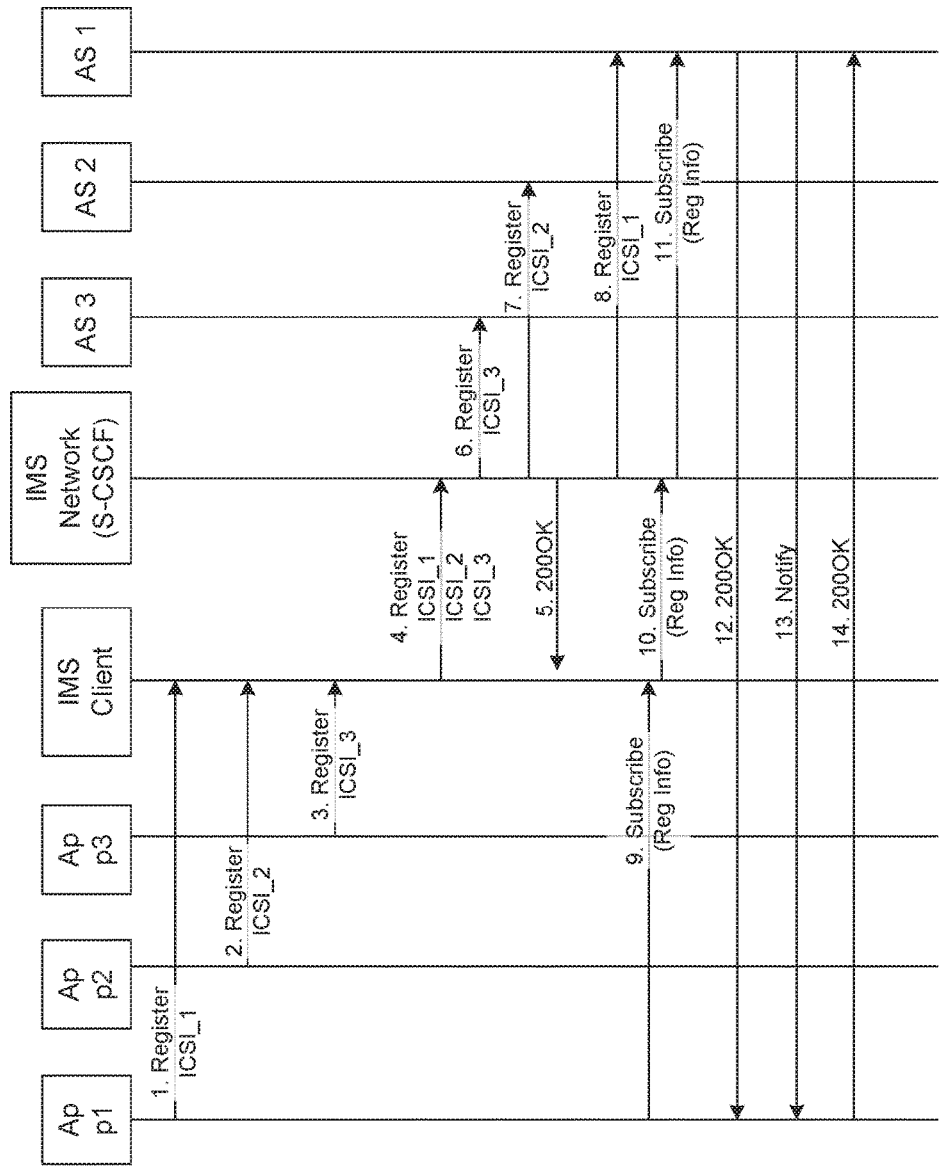
FIG. 6 is a flow diagram illustrating a partially unsuccessful registration for IMS services in which each requesting application receives a registration status notification from an associated application service.

FIG. 6 is a flow diagram illustrating a partially unsuccessful registration for IMS services in which each requesting application receives a registration status notification directly from an associated application service. Application 1 sends to the IMS client a request to register for a service identified as ICSI_1 (step 1); Application 2 sends to the IMS client a request to register for a service identified as ICSI_2 (step 2); and Application 3 sends to the IMS client a request to register for a service identified as ICSI_3 (step 3). After receiving the service registration requests, the IMS client sends all of the received requests to the IMS network (step 4), which returns an acknowledgement message to the IMS client (step 5). In step 6, the IMS network sends a registration request for the service identified as ICSI_3 to Application Service 3 (which is associated with ICSI_3); in step 7, the IMS network sends a registration request for the service identified as ICSI_2 to Application Service 2 (which is associated with ICSI_2); and, in step 8, the IMS network sends a registration request for the service identified as ICSI_1 to Application Service 1 (which is associated with ICSI_1). At step 9, the IMS client receives from Application 1 a subscription request to receive notification information regarding all registration requests sent by application 1. At step 10, the IMS client forwards the subscription request to the IMS network, and, at step 11, the IMS network forwards the subscription request to Application Service 1. After receiving the subscription request, Application Service 1 returns an acknowledgement directly to Application 1 (step 12). At step 13, Application Service 1 sends a notification to Application 1, which returns an acknowledgement to Application Service 1 (step 14).

Registration State Machines and Per-Application Registration State Machines

Figure 9:
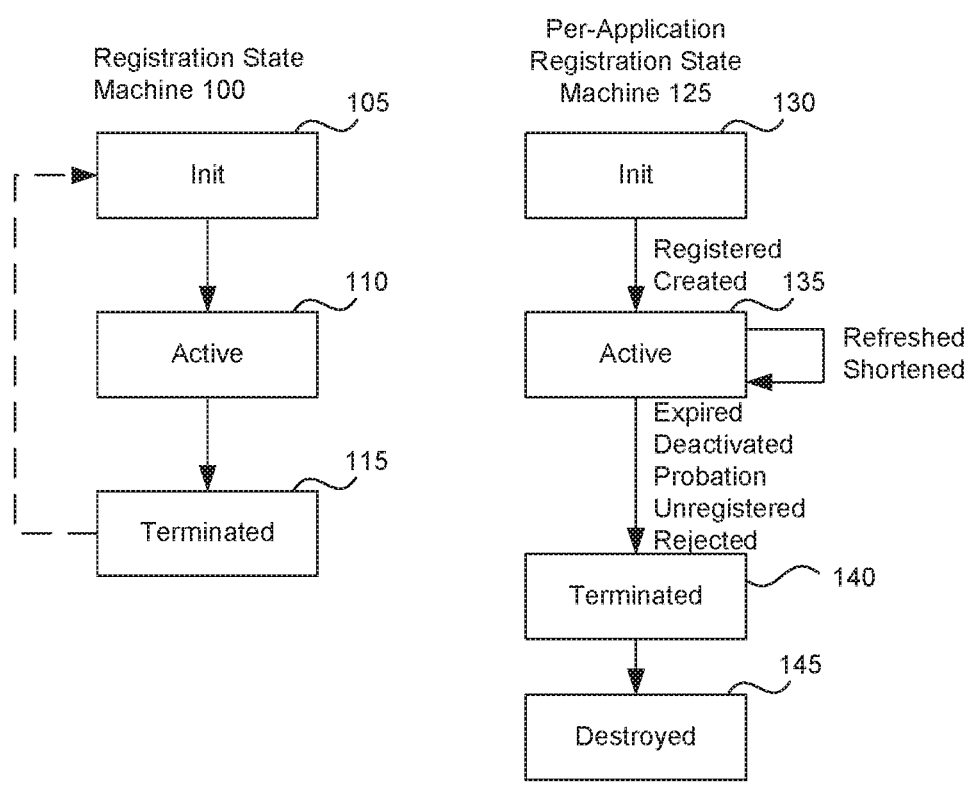
FIG. 9 is a block diagram illustrating a Registration State Machine and a Per-Application Registration State Machine.

FIG. 9 depicts a Registration State Machine (RSM) that is associated with each mobile device registered with the IMS core. As outlined in RFC 3680, an RSM 100 is associated with each mobile device address of record. When no mobile device is registered for the address of record, the RSM is in "Init" state 105. The RSM transitions to "Active" state 110 when a mobile device is registered to the address of record. The RSM stays in the Active state as long as there the mobile device is registered. When the mobile device is de-registered, the RSM transitions to "Terminated" state 115 and then immediately transitions to Init state 105. The transition from the Init state to the Active state, and the transition from the Active state to the Terminated state, generates a notification to any subscriber for registration information. The transition from the Terminated state to the Init state does not generate a notification.

FIG. 9 also depicts a per-application Registration State Machine 125 that is associated with each mobile device application making service calls through the IMS core. Each mobile device registration is associated with a set of applications. In addition to RSM 100 associated with the mobile device, each application on the mobile device is also modeled with its own state machine (a "per-application RSM"). However, per-application RSMs 125 do not exist when no application is registered. By contrast, RSM 100 always exists whenever an address of record exists. The Init state 130 and the Terminated state 140 of per-applications RSMs are transient, i.e., per-application RSMs transition to Active state 135 immediately after creation. When Terminated, per-application RSMs transition to Destroyed state 145. Consequently, subscribers are not notified regarding transitions from the Init state to the Active state and from the Terminated state to the Destroyed state.

The registration manager 335 may send registration information to a mobile device whenever the state of the RSM or any per-application RSMs is changed. In order to reduce notification traffic, the server may notify the full state only when subscribers require such a notification. Such a required notification may occur, for example, when a Subscribe with expire timer is received. Otherwise, the notification may contain only information about the RSM that changed states.

Per-Service Registration State Machines

As previously described herein, each application on a mobile device may be registered with a set of one or more services. These services are identified by IMS Communication Service Identifiers (ICS's) or IMS Application Registry Identifiers (IARIs). Each of these services is modeled with its own per-service Registration State Machines (a "per-service RSM"). The per-service RSM is instantiated when an application is registered for the IMS Service (as identified by an ICSI or IARI) and is deleted when the registration of the application for the IMS service identified by the ICSI or IARI is removed. A per-service RSM is identical to a per-application RSM, with the difference that for one per-application RSM there can be more than one per-service RSM.

Each application service may generate notifications to subscribers whenever an event occurs applicable to that service. In practice, however, notifications for each event at the service level may not be desirable. For the per-service RSMs, transitions to the Active state and transitions to the Terminated state can be notified to all subscribers. All other transitions may or may not be notified by the registration manager 335. Furthermore, in practice, it may be desirable to avoid generating full notifications that contain the entire registration status. Rather, notifications may contain registration information about only the changes that have actually occurred. For example, an application may be registered for a first service identified by ICSI-1 and for a second service identified by ICSI-2, thereby resulting in two per-service RSMs. When the RSM for ICSI-2 is terminated, the notification will contain the registration information that describes only this transition. The fact that the service identified by ICSI-1 stays Active is not notified.

Applying the per-service RSM in this manner enables applications running in the mobile device to subscribe to the IMS Service state and be notified only when a state change occurs. In the example above, the IMS application delivering the service identified by ICSI-2 can de-register and notify the user while the application delivering the service identified by ICSI-1 will continue to run.

Relationship Between RSM, Per-Application RSMs, and Per-Service RSMs

Figure 7:
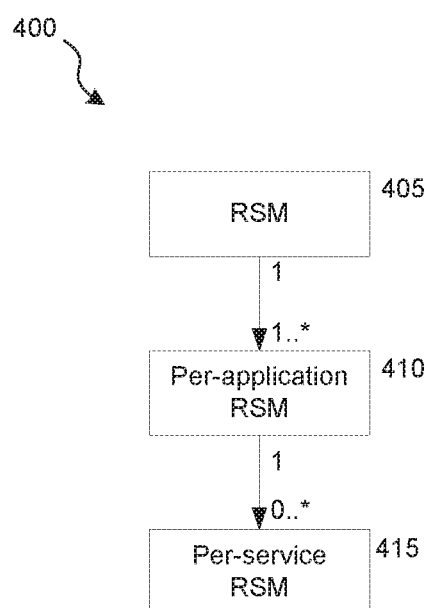
FIG. 7 is a block diagram illustrating the relationship between Registration State Machines, Per-Application Registration State Machines, and Per-Service Registration State Machines.

The diagram in FIG. 7 depicts the relationship between RSM 405, Per-Application RSMs 410, and Per-Service RSMs 415. When an RSM is in active state, at least one per-application RSM must exist because any registration must be associated with a set of applications. However, the per-service RSM is associated with a service identified by an ICSI or IARI. In practice, applications may be registered for IMS but not registered for a particular service.

A subscriber (i.e., an application or IMS client) may request notifications on transitions in the full RSM or in a per-service RSM. For the full RSM, the subscriber may send a Subscribe Request in accordance with RFC 3680. For the per-service RSM, the subscriber may include all of the ICS's and IARIs identifying the per-service RSM in the Subscribe Request or in a separate request. The registration manager 335 accepts subscriptions to a per-service RSM and generates notifications representing the services identified by ICS's and IARIs received in the Subscribe Request.

Registration Information Document

The registration manager 335 may convey changes in registration status to a mobile device in a Registration Information document. FIG. 8 depicts a representative Registration Information document 800, formatted as an extensible markup language (XML) document. It will be appreciated that other formatting languages may be used to provide the registration status information other than the one depicted.

The Registration Information document is represented by a reginfo element 805 and its version and state attribute. The RSM is represented by the Registration element 810 and its aor, id and state attributes. The per-application RSM is represented by the contact element, its attributes (attr), and the uri element. The unknown-param element is specially defined to convey application header parameters that are not specified in the SIP specification document (RFC 3261). In the depicted document, the unknown-param element is therefore used to represent the per-service RSM. Specifically, the unknown-param element is populated with the ICSI and IARI parameters 815 specifying the services for which registration status is sought or provided. As specified in TS 24.229, ICSIs are encoded as g.3gpp.icsi-ref and IARIs are encoded as g.3gpp.iari-ref. All application identifiers and service identifiers are added by the mobile device in the Contact and/or Accept-Contact header during the registration phase. These identifiers may also be included in all of the generic procedures applicable to other requests than Register request.

In addition to including the registration status of identified services, the Registration Information document may also contain an element 820 that conveys a reason for a per-service RSM transition. The reason may be provided when a service transitions to the Terminated state, or may be provided when a service transitions to other states. For example, in FIG. 8 the representative Registration Information document describes an active RSM, an active per-service RSM for MMTEL services, and a terminated per-service RSM for GameX version 1 services. In particular, the Registration Information indicates that the GameX Service failed because "[the user's] Subscription to GameX services has been terminated." By providing such reason for the per-service transition to an application, the application is able to convey that information to a user in order to enable the user to take steps to remedy the termination condition. Indeed, the actual reason for the state transition is particularly important in situations where the reason for a transition to the Terminated state is intended to be shown to a user of the mobile device.

In general, the system and method disclosed herein thereby extends the per-application RSM defined in RFC 3680 and defines a per-service RSM in the IMS context. Accordingly, the disclosed system allows an IMS application running in the mobile device to subscribe to state changes of a particular IMS service. It also allows an IMS Network to terminate one service while allowing others to continue.

The ability to provide registration status information on a per-service basis and a provide a reason for a transition to the Terminated state enables applications to make more efficient use of system resources and provide a richer user experience. For example, applications may make use of status and reason information to maintain service connections that have been successfully established while reattempting services that previously failed. Furthermore, registration status and reason information may allow an application to inform a user as to why a particular requested service is not available. A person of ordinary skill will appreciate that registration status and reason information may allow the disclosed system to offer additional functionality that may provide a richer user experience, such as displaying an indication as to whether a service interruption is temporary in nature (e.g., an application server is temporarily offline), or displaying an indication that the service interruption will remain in effect until the user takes a specified action (e.g., paying an overdue bill to the service provider or agreeing to pay for one or more individual services).

The above Detailed Description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps, or employ systems having steps, in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

The invention claimed is:

1. A computer-implemented method in an Internet Protocol Multimedia Subsystem (IMS) to provide service notifications from registered application services that are accessed on a mobile device, the method comprising:
  receiving, via the IP multimedia subsystem (IMS), a request to register at least one application on the mobile device with two or more associated services, wherein each of the services is provided via a computer;
  transmitting, to the mobile device, a plurality of notifications from the two or more services,
    wherein each of the plurality of transmitted notifications indicates the status of the corresponding service,
    wherein at least one of the plurality of transmitted notifications indicates a failure of the corresponding service and information regarding a reason for the failure of the corresponding service, and
    wherein each of the plurality of transmitted notifications is related to the corresponding application; and
  wherein at least one of the following actions (a), (b), (c), or (d) is taken on the mobile device in response to a determination that the transmitted notification indicates a registration failure:
    (a) displaying an indication as to whether the failure is temporary in nature;
    (b) displaying an indication that the failure will remain in effect until a specified action is taken;
    (c) registering the corresponding application with one or more different services; or
    (d) halting operation of the corresponding application.

2. The computer-implemented method of claim 1, wherein the plurality of notifications include an indication of whether each requested registration is active or terminated.

3. The computer-implemented method of claim 1, wherein the at least one application on the mobile device is deregistered in response to a determination that the transmitted notification indicates that the registration is terminated.

4. The computer-implemented method of claim 1, wherein at least one service is a location-based service.

5. The computer-implemented method of claim 1, wherein at least one service is a multimedia telephony service.

6. The computer-implemented method of claim 1, wherein at least one service is a video conferencing and sharing service.

7. The computer-implemented method of claim 1, wherein at least one service is an instant messaging and presence service.

8. The computer-implemented method of claim 1, wherein the nature of the failure corresponds to a server that is temporarily offline.

9. The computer-implemented method of claim 1, wherein the specified action is paying an overdue bill or agreeing to pay for a service.

10. The computer-implemented method of claim 1, wherein the reason for the registration status is contained in an extensible markup language (XML) document.

11. A non-transitory computer-readable medium, excluding transitory instructions, and storing instructions that, when executed by a processor of an Internet Protocol Multimedia Subsystem (IMS), cause the IMS device to execute a method comprising:
    receiving, via the IP multimedia subsystem (IMS), a request to register at least one application on the mobile device with two or more associated services, wherein each of the services is provided via a computer;
    transmitting, to the mobile device, a plurality of notifications from the two or more services,
        wherein each of the plurality of transmitted notifications indicates the status of the corresponding service,
        wherein at least one of the plurality of transmitted notifications indicates a failure of the corresponding service and information regarding a reason for the failure of the corresponding service, and
        wherein each of the plurality of transmitted notifications is related to the corresponding application; and
    wherein at least one of the following actions (a), (b), (c), or (d) is taken on the mobile device in response to a determination that the transmitted notification indicates a registration failure:
        (a) displaying an indication as to whether the failure is temporary in nature;
        (b) displaying an indication that the failure will remain in effect until a specified action is taken;
        (c) registering the corresponding application with one or more different services; or
        (d) halting operation of the corresponding application.

12. The non-transitory computer-readable medium of claim 11, wherein the plurality of notifications include an indication of whether each requested registration is active or terminated.

13. The non-transitory computer-readable medium of claim 11,
    wherein the one at least one application on the mobile device is deregistered in response to a determination that the transmitted notification indicates that the registration is terminated.

14. The non-transitory computer-readable medium of claim 11, wherein the reason for the registration status is contained in an extensible markup language (XML) document.

15. The non-transitory computer-readable medium of claim 11, wherein the instructions further cause the mobile device to deregister the associated application on the mobile device in response to determining that the transmitted notification indicates a terminated registration.

16. The non-transitory computer-readable medium of claim 11, wherein at least one service is a location-based service.

17. The non-transitory computer-readable medium of claim 11, wherein at least one service is an instant messaging and presence service.

18. The non-transitory computer-readable medium of claim 11, wherein at least one service is a video conferencing and sharing service.

19. The non-transitory computer-readable medium of claim 11, wherein the nature of the failure corresponds to a server that is temporarily offline.

20. The non-transitory computer-readable medium of claim 11, wherein the specified action is paying an overdue bill or agreeing to pay for a service.

* * * * *